United States Patent

Stone

[11] 3,812,345
[45] May 21, 1974

[54] ULTRASONIC STRAIN TRANSDUCING SYSTEM

[75] Inventor: Albert E. Stone, Hopkins, Minn.

[73] Assignee: Honeywell, Inc., Minneapolis, Minn.

[22] Filed: Apr. 19, 1972

[21] Appl. No.: 245,331

[52] U.S. Cl............ 246/249, 73/DIG. 4, 73/67.8, 73/88.5 R, 177/210, 340/1 R, 340/258 B
[51] Int. Cl.................... B61l 13/04, G01n 9/24
[58] Field of Search...... 73/DIG. 14, 67.8 R, 141 A, 73/88.5 R; 177/210; 246/249, 251; 340/258 B, 1 R, 30

[56] References Cited
UNITED STATES PATENTS

| | | | |
|---|---|---|---|
| 3,581,084 | 5/1971 | Kaneno et al. | 246/249 |
| 3,694,800 | 9/1972 | Frank | 340/1 R |
| 3,617,993 | 11/1971 | Massie et al. | 340/1 R |
| 3,047,850 | 7/1962 | Schmidt | 340/258 B |
| 3,725,854 | 3/1973 | Otsuka | 340/1 R |
| 3,140,612 | 7/1964 | Houghton et al. | 340/1 R |
| 3,428,139 | 2/1969 | Nolan | 177/210 X |
| 3,303,694 | 2/1967 | D'Onofrio | 73/DIG. 4 |
| 3,482,234 | 12/1969 | Doniger et al. | 246/169 D |
| 2,906,865 | 9/1959 | Jefferson | 246/251 |
| 3,447,367 | 6/1969 | Taylor | 73/141 |
| 2,724,107 | 11/1955 | Born | 73/67.8 |

FOREIGN PATENTS OR APPLICATIONS 656,399 8/1951 Great Britain............ 340/3 D

*Primary Examiner*—Gerald M. Forlenza
*Assistant Examiner*—George H. Libman
*Attorney, Agent, or Firm*—Lamont B. Koontz; Theodore F. Neils

[57] ABSTRACT

An ultrasonic strain transducing system has a hollow shell with a reference surface therein, the shell being positioned in a hole in a body in which the strain is to be measured. A crystal driven by electronic circuitry produces acoustical wave energy which is reflected back to the crystal by the reference surface. Motion of the reference surface in response to strain occurring in the body causes the crystal to change its complex electrical impedance which is sensed by the electronic circuit to provide an indication of the strain occurring.

11 Claims, 5 Drawing Figures

PATENTED MAY 21 1974　　　　　　　　　　　　　　　3,812,345
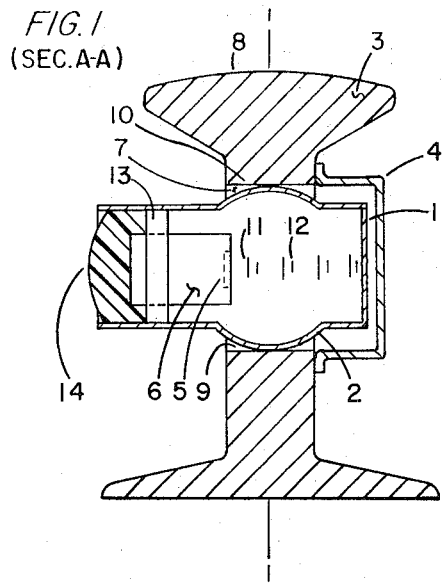
FIG. 1 (SEC. A-A)
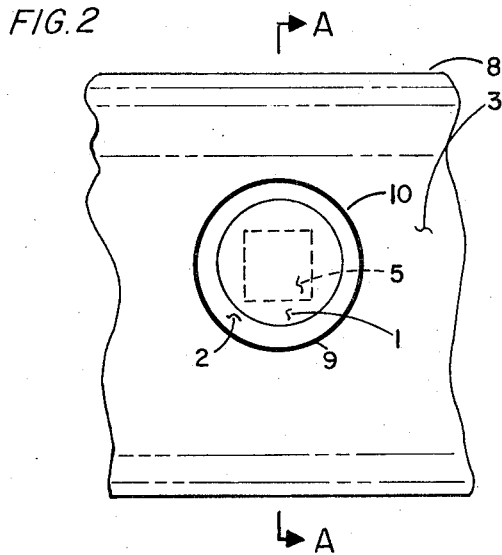
FIG. 2
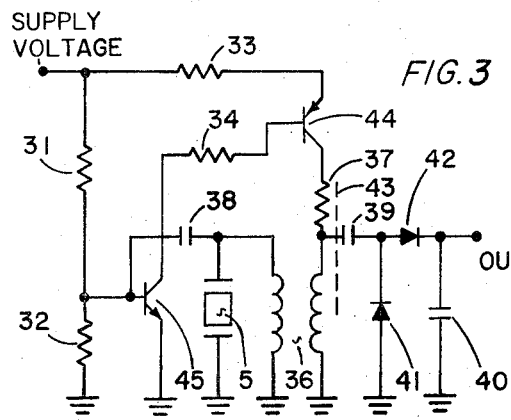
FIG. 3
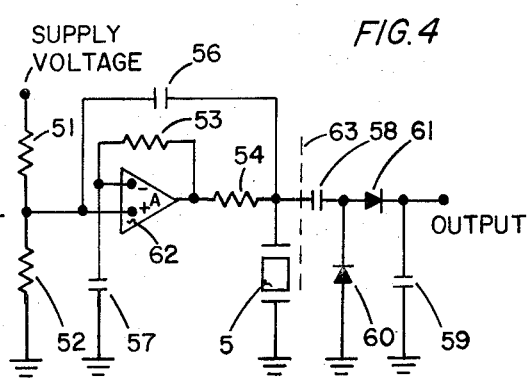
FIG. 4
FIG. 5
STRAIN TRANSDUCER AND ASSOCIATED CKTS → SIGNAL SELECTOR → THRESHOLD → LOGIC →
STRAIN TRANSDUCING SYSTEM NO. 2
STRAIN TRANSDUCING SYSTEM NO. 3

ULTRASONIC STRAIN TRANSDUCING SYSTEM

BACKGROUND OF THE INVENTION

This invention concerns ultrasonic strain sensors.

Several types of strain sensors are available to provide indications of strain occurring in a body. Well known are wire strain gages and semiconductor strain sensors. Many of these strain sensors while offering good to excellent accuracy do so only in laboratory conditions or other relatively well controlled environments and by use of compensation techniques. Further, many of these strain sensors have exacting requirements in integrating them with the body in which the strain is to be measured. The present invention offers the advantage of a capability for being field mounted and operable in outdoor conditions.

SUMMARY OF THE INVENTION

The present invention is a strain transducing system for providing a signal indicative of strain changes which are desired to be known that occur in a body into which the transducing system is integrated. The body when subject to changing strain causes a reference surface to move with respect to an acoustic transducer means, the motion being in response to the changing strain. Direct acoustical wave energy provided by and traveling from the acoustic transducer means to the reference surface becomes reflected acoustical wave energy after reflection at the reference surface. The reference surface is such as to direct the reflected acoustic wave energy to impinge on the acoustic transducer means. The motion of the reference surface alters a path between the acoustic transducer means and the reference surface along which acoustical wave energy is traveling. This altering of the path changes relationships at a surface of the acoustic transducer means appearing as a change in the complex acoustical impedance loading the acoustic transducer means. Electrical circuitry to detect the change will provide an electrical signal in response to the changing complex acoustical impedance and so in response to the strain alterations in the body.

BRIEF DESCRIPTION OF THE DRAWINGS

FIG. 1 is a side view of the invention mounted in a cut-away railroad rail,

FIG. 2 is an end view of the invention shown mounted in a section of a railroad rail, FIG. 3 is an electronic circuit schematic of a circuit used, FIG. 4 is a schematic of an alternative circuit used, and FIG. 5 is a block diagram which indicates a signal operational sequence.

DESCRIPTION OF THE PREFERRED EMBODIMENTS

In FIG. 1 there is shown the invention mounted in railroad rail 3 which has been cut away for this view. A hole 7 with upper surface 10 and lower surface 9 has been provided in the railroad rail 3. This hold is positioned between the flanges of the rail such that, approximately, the neutral surface of the rail when placed under transverse stress lies along a diameter of the hole. A hollow shell 2, also cut away in this view, has been inserted into the hole 7 in a slight interference fit. The hollow shell is to contact the rail approximately along the vertical axis at the center of the rail in FIG. 1 such that points of contact between the shell and the rail are approximately on the neutral axis of the rail. At one end of hollow shell 2 is reference surface 1. An electronics package 6 has been inserted into the opening in the opposite end of the shell 2. The face of the electronic package 6 has ultrasonic transducer 5 mounted therein. A retaining ring 13 secures the electronics package 6 within hollow shell 2. A potting compound is poured into the end of the unit to close it up and is shown after solidification as item 14. Also shown is protective cover 4 enclosing the reference surface 1 and covering the hole 7. Further covering protection can be provided as needed.

FIG. 2, shows an end view of the invention with hollow shell 2 as mounted in hole 7 in the railroad rail 3. Protective cover 4 has been removed in this view. Only a section of railroad rail 3 has been shown.

In operation, a railroad car moving along railroad rail 3 produces a force in a downward direction on surface 8. This force tends to depress the rail beneath the railroad car wheel. The resulting strain in the stressed rail is such that upper surface 10 and lower surface 9 of hole 7 move relatively closer to one another. As a result, shell 2 is squeezed such that reference surface 1 changes its position with respect to the face of ultrasonic transducer 5. An arrangement for providing a change in position of a surface mounting an ultrasonic transducer relative to another surface, a reference surface, in response to strain in a railroad rail is also possible by use of one or more surfaces integral to the railroad rail or modified railroad rail.

The electronics package 6 is operably connected to ultrasonic transducer 5 to cause it to pulse, typically at 40khz, and thereby produce direct acoustic wave energy 11. This direct acoustic wave energy is propagated toward reference surface 1 where it is reflected. On return, after reflection, the reflective acoustic wave energy 12 impinges on ultrasonic transducer 5. Thus, substantially a standing wave pattern occurs within hollow shell 2 between the reference surface 1 and the face of the ultrasonic transducer 5. The geometrical relationship of the shell 2 and ultrasonic transducer 5 is such that the waves may be characterized with a single spatial dimension perpendicular to reference surface 1 and ultrasonic transducer 5.

The complex acoustical impedance loading the face of the ultrasonic transducer 5 will depend on the spatial relationship between the direct acoustical energy waves and the reflected acoustical energy waves, and further, on the distance between ultrasonic transducer 5 and reference surface 1. Along the single spatial dimension noted above, the relationship between the direct acoustic energy waves and the reflected acoustic energy waves will depend on the wavelength, the character of the medium of propagation and the characteristics of reference surface 1.

The complex electrical impedance which ultrasonic transducer 5 presents to electronics package 6 operably connected thereto will be a function of the complex acoustic impedance loading the face of ultrasonic transducer 5 as well as the complex mechanical impedance of ultrasonic transducer 5 itself. Therefore, imposition of strain in the railroad rail will cause the distance between the ultrasonic transducer 5 and reference surface 1 to change slowly with respect to the ultrasonic repetition rate and will in turn cause an accompanying change in the complex acoustic impedance loading the face of the ultrasonic transducer 5 to occur. This change in acoustic impedance effectively results in a change of the complex electrical impedance presented to the electronics package 6 by the ultrasonic transducer 5. The circuitry in the electronics pacakge 6 provides a signal corresponding to this change in electrical impedance as set out below with the result the electrical signal is indicative of the strain imposed on the railroad rail.

FIG. 3 and FIG. 4 show the schematics of two alternative electronic circuits to be used in electronics package 6 either of which will drive ultrasonic transducer 5 and detect changes in its complex electrical impedance. In both figures, two functional stages of a circuit are shown, one on either side of dashed dividing line. On the left of the dashed dividing line is an oscillator circuit while on the right is a demodulator circuit. In FIG. 3, the NPN transistor 45 and PNP transistor 34 form a two stage amplifier together with biasing resistors 31 through 34. Resistor 37 is in a voltage divider arrangement with the primary of transformer 36. Across the secondary of transformer 36 is piezoelectric crystal 5 which serves dual purposes in this circuit. On the one hand, piezoelectric crystal 5 is the ultrasonic transducer 5 of FIG. 1 providing acoustic energy waves. On the other hand, piezoelectric crystal 5 is the frequency control element for the oscillator. An output taken across piezoelectric crystal 5 is fed back through capacitor 38 to the base of NPN transistor 45, the input of the two stage amplifier. The circuit time constants are such that piezoelectric crystal 5 through its complex electrical impedance controls the frequency of oscillation of the oscillator at a resonance point of the crystal. To the right of dotted line 43, capacitors 39 and 40 and diodes 41 and 42 form a standard voltage doubler, amplitude modulation demodulator from which the circuit output signal is taken.

In operation, the oscillator of FIG. 3 drives piezoelectric crystal 5 which in turn provides the direct acoustic wave energy which propagates to reference surface 1 of FIG. 1. Since the complex electrical impedance of piezoelectric crystal 5 controls the frequency of oscillation, any change in the complex electrical impedance accompanying a change in the complex acoustic impedance loading the face of piezoelectric crystal 5, i.e., ultrasonic transducer 5 of FIG. 1, causes a slight change in the frequency of oscillation and a change in the amplitude of oscillation. The amplitude modulation demodulator on the right hand side of dotted line 43 picks up this resulting amplitude modulation signal and provides an output indicative of the changing acoustic impedance load and hence of the strain imposed upon the shell 2 of FIG. 1.

A similar operating result is reached at the circuit in FIG. 4. A voltage doubler, amplitude modulation demodulator identical to that of FIG. 3 is found to the right of dashed line 63 consisting of capacitors 58 and 59 and diodes 60 and 61. The oscillator to the left of dotted line 63 uses operational amplifier 62 in place of discrete transistors to provide the gain necessary for oscillation. Once again, piezoelectric crystal 5 serves a dual purpose of providing direct acoustic wave energy when driven by the oscillator while also controlling the frequency of the oscillator. In this circuit, however, no transformer is required and the oscillator output is fed directly back to the operational amplifier positive input through capacitor 56. Resistor 54 is in a voltage divider arrangement with piezoelectric crystal 5 to provide the oscillator output at the junction of these two components. Resistors 51 through 53 and capacitor 57 provide the necessary operating conditions for operational amplifier 62. The operational sequence closely parallels that of FIG. 3.

A block diagram form for the strain transducing system is shown in FIG. 5. The mechanical elements shown in FIGS. 1 and 2 together with either the circuit of FIG. 3 or alternatively that of FIG. 4 placed in the electronics package 6 of FIG. 1 provide the contents of the first block to the left in FIG. 5. To eliminate the effects of aging components and mountings as well as the environmental effects, particularly when used outdoors, only signals having rates of change therein greater than the minimum rate of change expected in the strain when imposed should be recognized as proper indications of strain. The signal selector shown in the second block in the block from the left in FIG. 5 accomplishes this signal screening. Such screening is easily accomplished by use of a standard high-pass filter having its cut-off frequency chosen to filter out those portions of signals having rates of change below the expected minimum rate of change of imposed strain alterations. To minimize noise signals in the system an upper limit on the rate of change of signals permitted to pass this stage may also be desirable. If so, rather than using a high-pass filter, use of a bandpass filter would be appropriate.

For various reasons only strains in a certain amplitude range or ranges may be of interest. The use of threshold circuits can limit recognition of signals representing strain to only those signal portions appearing with any particular range or ranges. For example, it may be desirable to distinguish between railroad cars and small repair carts moving along surface 8 of railroad rail 3 shown in FIG. 1. If only the presence of the heavier car is to be noted, a standard comparator circuit may be used in the third block of FIG. 5 labeled threshold. Thus when a railroad car moves along the railroad rail to cause a strain therein, the comparator will shift voltage levels at its output, for the significantly smaller strain of a repair cart moving on the railroad rail, no voltage level shift will be present at the comparator output.

With the use of several transducing systems connected through logic circuitry, the direction of travel along the railroad rail can be determined. The use of three such strain transducing systems, with logic circuitry requiring sequential outputs from these three systems, can determine direction of travel and limit ambiguity due to starting and stopping and reversing of railroad cars passing along the railroad rail. In such an arrangement of multiple strain transducing systems, it would be possible to keep track of the railroad cars located in a railroad yard area using only the outputs from the systems to inform the observer of comings and goings of railroad cars in the railroad yard area while ignoring repair cart passages in or out of the area.

The embodiments of the invention in which an exclusive property or right is claimed are defined as follows:

1. A strain transducing system for providing a conditioned signal indicative of strain in a first body by use of acoustical standing wave energy which comprises:

acoustic transducer means to propagate direct acoustical wave energy located in a second body, a reference surface located in said second body which is placed in motion with respect to said acoustic transducer means in response to alterations of strain occurring within said first body, said reference surface capable of and positioned to reflect said direct acoustical wave energy to thereby provide reflected acoustical wave energy impinging on said acoustic transducer means resulting in substantially a standing wave pattern having a complex acoustic impedance associated therewith loading said acoustic transducer means, whereby said motion causes a corresponding change in a complex electrical impedance characterizing said acoustic transducer means through a corresponding change in said complex acoustical impedance, and circuit means operably connected to said acoustic transducer means to provide a first signal representing changes of said complex electrical impedance of said acoustic transducer means.

2. The system of claim 1 wherein said first body is a railroad rail.

3. The system of claim 1 wherein said first signal is applied to an input of a signal selector whereby components of said first signal having a rate of change less than a cut-off value are substantially removed from said first signal to thereby provide at an output of said signal selector said conditioned signal.

4. The system of claim 1 wherein said acoustic transducer means includes a piezoelectric crystal.

5. The system of claim 3 wherein said conditioned signal is applied to an input of a threshold device whereby a second signal is provided on an output of said threshold device whenever said condition signal has an amplitude satisfying a set of predetermined conditions.

6. The system of claim 1 wherein said first body is a railroad rail having a hole therein and said second body is a shell structure which is positioned in said hole in a slight interference fit to thereby be compressed upon the imposition of strain in said first body.

7. The system of claim 6 wherein said first signal is applied to an input of a signal selector whereby components of said first signal having a rate of change less than a cutoff value are removed from said first signal to thereby provide at an output of said signal selector said condition signal.

8. The system of claim 7 wherein said conditioned signal is applied to an input of a threshold device whereby a second signal is provided on an output of said threshold device whenever said condition signal has an amplitude satisfying a set of predetermined conditions.

9. A strain transducer to indicate strain in a first body, for use in a strain detection system which detects an output of said strain transducer, by use of acoustical standing wave energy, said transducer comprising:

acoustic transducer means to propagate direct acoustical wave energy located in a second body, and a reference surface located in said second body which is placed in motion with respect to said acoustic transducer means in response to alterations of strain occurring within said first body, said reference surface capable of and positioned to reflect direct acoustical wave energy to thereby provide reflected acoustical wave energy impinging on said acoustic transducer means resulting in substantially a standing wave pattern having a complex acoustic impedance associated therewith loading said acoustic transducer means, whereby said motion causes a corresponding change in said complex acoustical impedance.

10. The system of claim 9 wherein said first body is a railroad rail.

11. The system of claim 9 wherein said first body is a railroad rail having a hole therein and said second body is a shell structure which is positioned in said hole in a slight interference fit to thereby be compressed upon the imposition of strain in said first body.

* * * * *